US007652591B2

(12) United States Patent
Moroni et al.

(10) Patent No.: US 7,652,591 B2
(45) Date of Patent: Jan. 26, 2010

(54) DEVICE FOR DETECTING THE POSITION OF A MOBILE ELEMENT TO WHICH IT IS COUPLED AND RELATED MOBILE ELEMENT

(75) Inventors: Andrea Moroni, Gorla Minore (IT); Rossano Marchesi, Dongo (IT); Massimo Civetta, Musso (IT)

(73) Assignee: ABB S.p.A., Milan (IT)

( * ) Notice: Subject to any disclaimer, the term of this patent is extended or adjusted under 35 U.S.C. 154(b) by 467 days.

(21) Appl. No.: 11/431,511

(22) Filed: May 11, 2006

(65) Prior Publication Data

US 2006/0255792 A1 Nov. 16, 2006

(30) Foreign Application Priority Data

May 13, 2005 (IT) ................ BG05A0028

(51) Int. Cl.
 *G01V 3/00* (2006.01)
(52) U.S. Cl. ................ 340/854.4; 340/853.1; 324/113; 343/900
(58) Field of Classification Search ................ 343/900, 343/902; 324/113
See application file for complete search history.

(56) References Cited

U.S. PATENT DOCUMENTS

| 4,424,669 | A | * | 1/1984 | Fage | 60/230 |
| 4,554,535 | A | | 11/1985 | Floris et al. | |
| 4,559,709 | A | * | 12/1985 | Beseme et al. | 33/544.3 |
| 4,698,794 | A | * | 10/1987 | Kruger et al. | 367/83 |
| 4,876,531 | A | * | 10/1989 | Dondorf | 91/361 |
| 7,138,929 | B2 | * | 11/2006 | Jeffryes et al. | 340/853.1 |
| 7,477,161 | B2 | * | 1/2009 | Macpherson et al. | 340/853.3 |
| 7,573,397 | B2 | * | 8/2009 | Petrovic et al. | 340/854.6 |
| 2004/0185875 | A1 | * | 9/2004 | Diacakis et al. | 455/456.3 |
| 2005/0086985 | A1 | * | 4/2005 | Rosi et al. | 70/372 |
| 2006/0292039 | A1 | * | 12/2006 | Iida | 422/82.05 |

FOREIGN PATENT DOCUMENTS

| DE | 29 12 803 | | 10/1980 |
| DE | 2 069 154 A | * | 8/1981 |
| EP | 0 318 268 | | 5/1989 |
| JP | 58 118902 | | 7/1983 |
| JP | 60-119041 | * | 6/1985 |
| JP | 62 134518 | | 6/1987 |
| WO | WO-00 02012 | | 1/2000 |

* cited by examiner

*Primary Examiner*—Trinh V Dinh
(74) *Attorney, Agent, or Firm*—Connolly Bove Lodge & Hutz LLP

(57) ABSTRACT

A device for detecting the position occupied by a mobile element operatively associated therewith in relation to a reference position, comprising at least one container containing a fluid and a detector device operatively connected to said container, said detector device being configured so as to provide a signal to indicate the actual position of said mobile element as a function of at least one parameter recorded thereby and indicative of an operative condition of the fluid, or of a condition of operative interaction between the fluid and the detector device.

18 Claims, 3 Drawing Sheets

DEVICE FOR DETECTING THE POSITION OF A MOBILE ELEMENT TO WHICH IT IS COUPLED AND RELATED MOBILE ELEMENT

FIELD OF THE INVENTION

The present invention relates to a device for detecting the position occupied by a mobile element to which it is coupled in relation to a reference position.

BACKGROUND OF THE INVENTION

In certain practical applications, it is necessary to use mobile elements, such as structures enabling overland communication paths to overcome obstructions, mobile barriers, gates, walls of various kinds serving specific functional purposes, such as temporarily isolating a particular area, modifying the course of a fluid by channeling it in a given direction, preventing or at least containing the passage of a fluid into a given area, and so on. For such purposes, mobile elements are generally connected, e.g. by hinged means, to a supporting or anchoring structure and then, when needed, they are moved by suitable means so as to bring them into the required working position, e.g. by transferring them or, more commonly, by rotating them around the hinged axis. In many cases, such maneuvers are conducted only for a limited period of time and not necessarily with a regular frequency, and often also with very lengthy intervals between one maneuver and the next, so the mobile elements may remain at rest for the majority of their working life.

It is consequently clear that, in such contexts, it is essential to have suitable control devices installed together with the mobile elements to enable the actual working efficiency of the latter to be kept under control, and particularly to make sure that, in the event of their being moved, the mobile elements will respond correctly, even after very lengthy periods of inactivity, and move into the required position. In addition to the above-mentioned fundamental control function, these devices must also be capable of meeting further requirements dictated by the working conditions in which the mobile elements, with which they are associated, are operated, such as a resistance to mechanical or thermal stresses, a sufficiently long working life, the capacity to work in variable ambient conditions and to withstand aggressive elements, reliability, capacity for local and particularly for remote communication, minimal servicing demands, and so on.

SUMMARY OF THE INVENTION

The object of the present invention is thus to provide a device capable of accurately and reliably detecting the position occupied by a mobile element associated therewith in relation to a given reference position in the long term, and that is also suitable for working in various application contexts, and particularly in highly aggressive ambient conditions, principally in environments with a high chlorine content, in fluids containing corrosive chemicals, e.g. acids, in situations wherein flora and fauna would risk damaging its performance and functional characteristics, and particularly on the sea floor.

This object is achieved by a device for detecting the position occupied by a mobile element operatively associated therewith in relation to a reference position, wherein said device comprises at least one container containing a fluid and a detector device operatively coupled to said container, said detector device being configured so as to provide a signal to indicate the actual position occupied by said mobile element as a function of at least one parameter recorded thereby of an operative condition of the fluid, or of a condition of operative interaction between the fluid and said detector device.

According to a particularly preferred embodiment, the detector device is configured so as to provide a signal indicating the actual angle of inclination of the mobile element with respect to a reference position as a function of the pressure exerted on the device by the fluid.

The detector device according to the present invention is particularly suitable for use in mobile elements, such as structures for enabling overland communication paths to overcome obstructions, mobile barriers, gates, walls, and the like, destined for use in a fluid environment, and more specifically in a marine environment, and it is described herein with reference to such an application without this in any way restricting its application to other contexts.

BRIEF DESCRIPTION OF THE DRAWINGS

Further characteristics and advantages of the invention will be more evident from the description of several preferred but not exclusive embodiments of the device according to the invention, illustrated herein as non-restrictive examples with the aid of the attached drawings wherein.

DESCRIPTION OF THE PREFERRED EMBODIMENTS

With reference to the above-mentioned figures, the position detecting device according to the present invention, globally indicated by the reference number 100, comprises at least one container 1 containing a fluid 2, and a detector device operatively coupled to the container 1, that is configured so as to provide a signal to indicate the actual position of a mobile element as a function of at least one parameter detected by the device and indicative of an operative condition of the fluid, or of a condition of operative interaction between the fluid and the detector device. According to a particularly preferred embodiment of the invention, and based on the modalities outlined in greater detail in the following description, the detector device is configured so as to provide a signal indicating the actual angle of inclination of the mobile element with respect to a reference position as a function of the pressure exerted on the device by the fluid.

Figure 1:
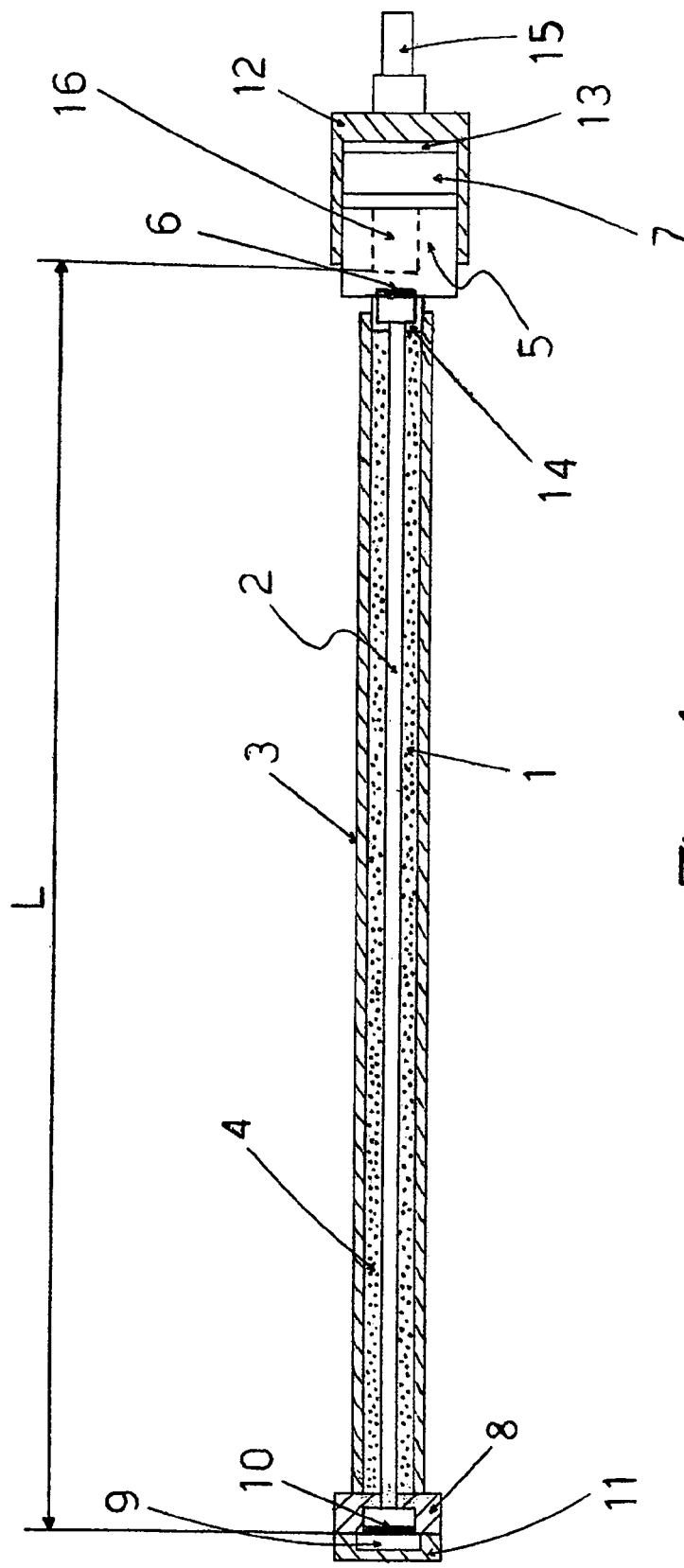
FIG. 1 is a cross-section schematically showing the detector device according to the invention.

As shown schematically in FIG. 1, the container 1 preferably has a body of capillary type, i.e. a substantially tubular body that is distinctly smaller in cross-section than in longitudinal length, and that is preferably open-ended ends and that is advantageously almost completely filled with a preferably incompressible fluid 2. The fluid 2 in question may be a fluid of high specific weight so as to improve the accuracy of the readings, e.g. a silicone oil, mercury, or any other fluid, providing it is compatible with the needs of the application.

Preferably, as illustrated in FIG. 1, the first container 1 is surrounded by a protective element 3, again consisting—in the embodiment illustrated herein—of a tube-shaped body so as to embrace the capillary 1 and protect it from the outside environment. The protective element 3 is preferably made of a material with an excellent capacity for corrosion resistance, e.g. steel type AISI 316 Ti/I AISI 316 L, duplex or superduplex, or any other material suitable for the purposes of the application. It may be to advantage for the cavity between the capillary 1 and the tubular barrier 3 to be partially or totally filled with a material 4, e.g. rubber, suitable for damping or absorbing any vibrations.

Figure 2:
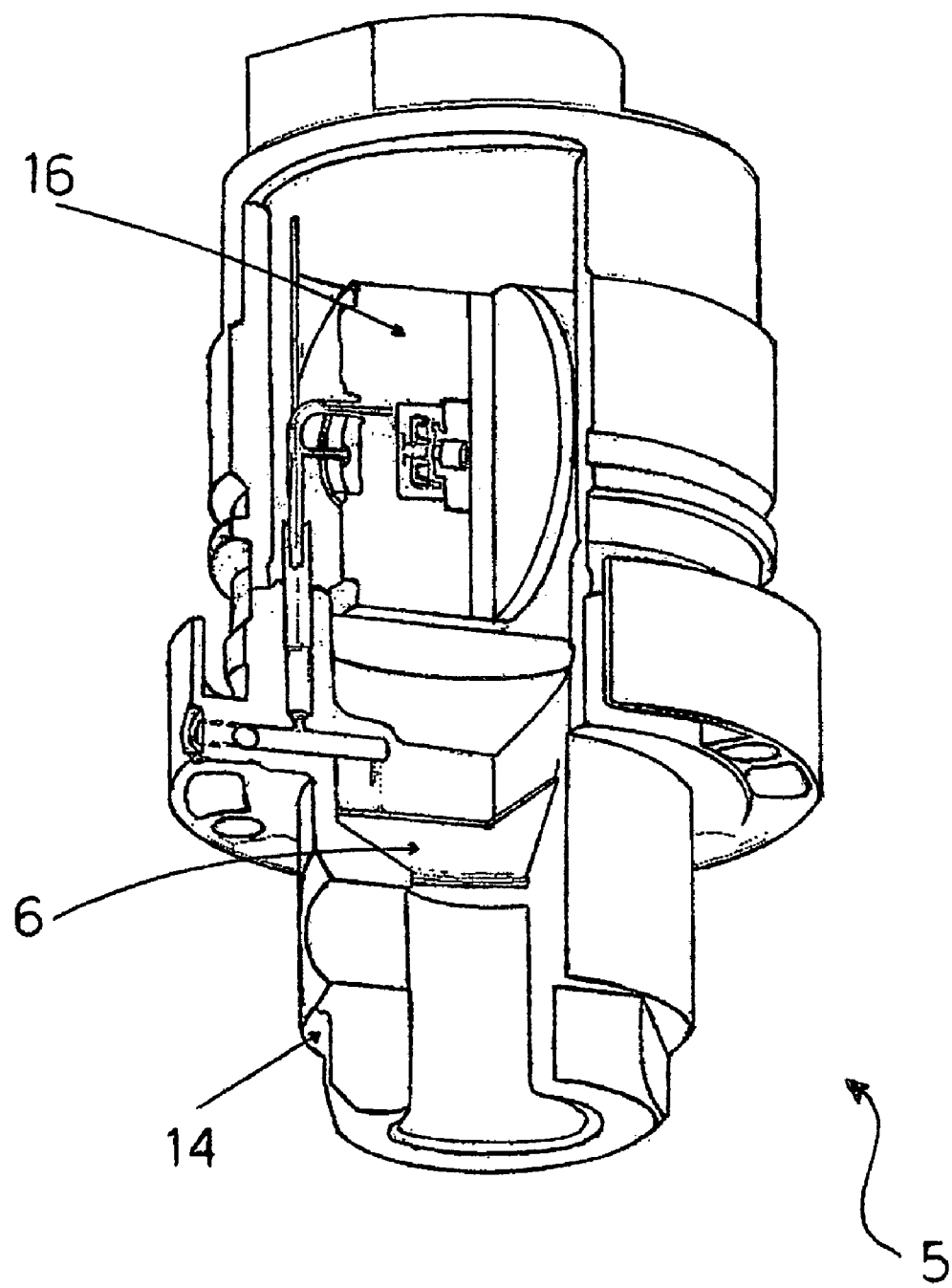
FIG. 2 shows an example of an absolute pressure transmitter suitable for use in the device according to the invention.

According to a preferred embodiment, the detector device comprises a pressure transducer 5, which is installed at one end of the capillary 1, and which preferably, but not necessarily, has an elastic diaphragm, typically made of metal, indicated schematically in FIG. 1 by the reference number 6, which is inserted at one end of the capillary 1, at the interface between the device and the fluid 2. The transducer 5 advantageously consists of an absolute pressure transmitter, a practical example of which is shown in FIG. 2, wherein the pressure sensor 16 is also illustrated. The sensor 16 may be of various kinds, such as the microchip or membrane types.

Figure 3:
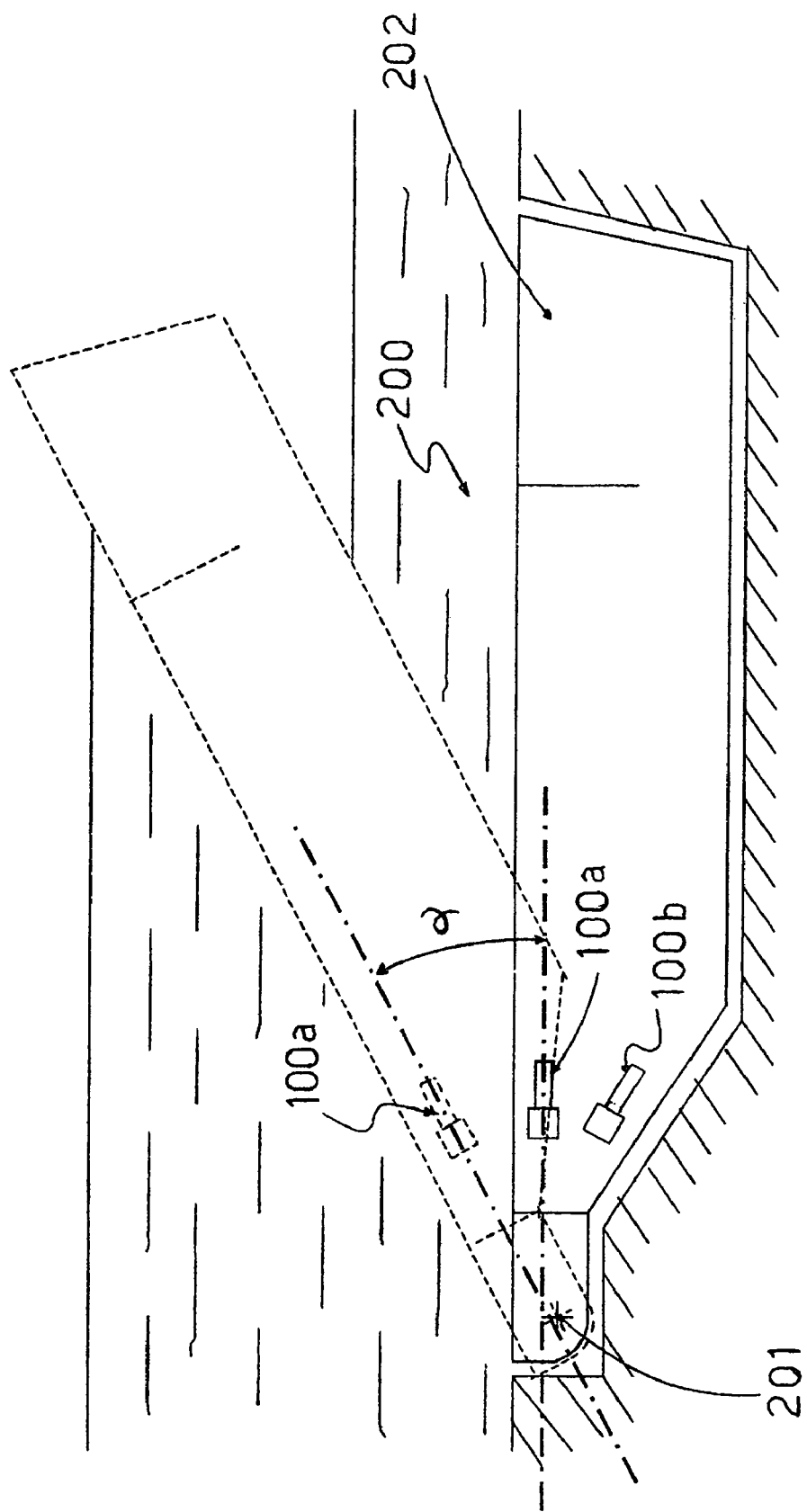
FIG. 3 schematically shows a mobile element coupled with a device according to the invention.

The detector device also comprises an electronic data processor 7, consisting basically of a microprocessor with suitable circuits for powering the device and for generating the analog and/or digital communication signal (the architecture of which is well known and consequently not described in detail herein), which is operatively connected to the transducer 5 and, as a function of the signal received from the transducer 5, the processor obtains a signal indicating the position actually occupied by a mobile element, indicated in FIG. 3 by the reference number 200, that is solidly attached to the detector device 100.

The device 100 according to the invention can be fitted with a suitable model of absolute pressure transmitter, or commercially-available processor unit, so this is not described in detail herein. For instance, a transmitter of the type marketed by the ABB company, model 264N, with the corresponding electronic processor AU0009, can be used.

In a particularly preferred embodiment, the device 100 comprises a separator 8, with a corresponding separating diaphragm 10, that is operatively associated with the capillary 1, and a chamber 9, preferably in a vacuum, that is operatively associated with the diaphragm 10. To be more precise, according to an embodiment that is well known and consequently not described in detail herein, the diaphragm—which is of the type commonly used in various processing systems for separating instrumental parts of devices (such as pressure transmitters) from process fluids—consists of a shaped body, generally in the form of a disc, with an elastic diaphragm 10, usually made of metal and generally also suitably treated or coated with deposited materials used to provide a protective surface, e.g. noble metals, to protect the diaphragm against corrosion by a process fluid. As illustrated in FIG. 1, the separator 8 is advantageously attached hermetically, and preferably welded, to the tubular element 3, with the diaphragm 10 interfacing with the fluid 2 at one end of the capillary 1. Moreover, the elastic diaphragm 10 of the separator 8 is advantageously more elastic than the diaphragm 6 of the transducer 5, or (if the latter is not used) than the sensor 16 incorporated inside the transducer, so that any effects capable of causing an expansion of the fluid 2 are absorbed by the diaphragm 10, thus ensuring more accurate and reliable readings. In addition, the vacuum in the chamber 9 means there is no air in the cavity, which might expand as a result of temperature changes and thus give rise to errors in the system.

As shown in FIG. 1, a second, preferably cup-shaped protective element 11, which is also advantageously made of a material with an excellent corrosion resistance, such as steel, is connected to the body of the separator 8 at the opposite end to the protective element 3. Said cup-shaped element 11 is advantageously also attached hermetically, preferably by welding, to the body of the separator 8, its inside walls thereby delimiting the chamber 9 in line with the elastic diaphragm 10.

The device 100 comprises a housing 12, also preferably made of a material an excellent corrosion resistance, that is installed at the opposite end to the cup-shaped element 11, and attached hermetically, and preferably welded to the outer surface of the body of the transducer 5, thereby delimiting an interior space 13 housing the electronic processor 7. Finally, in line with the interface between the capillary 1 and the pressure transmitter 5, there may be an adapter flange 14, which surrounds the outer end of the capillary 1 and is attached hermetically, and preferably welded, to the body of the transmitter 5 on one side and to the tubular protective element 3 on the other.

Thus, in practical terms, the device 100 globally constitutes a hermetically sealed structure that is protected from the outside environment.

The device 100 according to the invention is particularly suitable for use in a mobile element, such as a mobile barrier or gate, destined for use in a fluid environment, and especially in a mobile element destined for immersion in a marine environment and for operating in order to counteract rising sea levels and thus contain their effects on a given area; a typical example is the longstanding problem of the Venetian Lagoon and the need to safeguard parts of the city against flooding at high tide. Thus a further object of the present invention consists in a mobile element 200 destined for use in a marine environment, of the type comprising a shaped body with a portion suitable for connection to an anchoring surface, characterized in that it comprises at least one device 100 of the type previously described.

To be more specific, as illustrated in FIG. 3, the mobile element 200 has a hollow body that is hinged at one end 201 to an anchoring surface, such as a base on the sea floor, with the device 100 installed inside the cavity 202 and solidly attached to the body 200. The device 100 is preferably installed in a position proximal to the anchored portion 201. Better still, the mobile element 200 comprises at least two devices 100, both solidly attached to the inside of the cavity 202 in the vicinity of the hinging point and arranged, in relation to the point of anchorage so that: one device 100a is in line with the upper surface and the other device 100b is in line with the lower surface of the element 200, so as to obtain an optimal reading accuracy both of the reference position and of the working position.

With the aid of FIG. 3, the following is a brief description of the operation of the device 100 according to the invention.

As shown schematically in FIG. 3, the device 100 is coupled to a mobile element 200 in order to measure the position of the latter with respect to a reference position, such as the horizontal illustrated by the continuous line. In said position, the fluid 2 exerts a certain pressure on the transducer, which records a corresponding value that can be considered as an initial reference value, e.g. zero. When the mobile element 200 is rotated (when the tide rises, for instance) and it moves into the position indicated by the dotted line, the device 100 solidly attached to the mobile element follows its movement and the amount of pressure exerted by the fluid 2 on the transducer 5 varies depending on the position occupied by the mobile element; the transducer 5 sends a signal corresponding to said pressure to the processor 7, which produces a corresponding signal to indicate the angle of inclination a reached by the mobile element 200 with respect to the reference position, e.g. by means of the formula $$\alpha = \arcsin \cdot \frac{10 \cdot P_{(mbar)}}{L \cdot \delta_{filling}}$$

where $P_{(mbar)}$ is the pressure recorded by the transmitter in millibar, $\delta_{filling}$ is the density of the fluid 2, L is the distance between the diaphragm 10 and the interface serving as input for the sensor 16 in the transducer 5, and a is the angle coming between the reference position and the position occupied by the mobile element. This signal is sent to a control unit, e.g. by means of a connector 15 that is also preferably attached hermetically to the device 100. The electronics can be advantageously adapted to send the value of the angle a measured by means of an analog signal, e.g. 4-20 mA, or data, using any communication protocol the user wishes.

In practice, the above description shows how the device according to the present invention fulfills the established object, affording a solution that is simple from the structural point of view and effective from the functional point of view. In fact, the device enables the position of the mobile element to which it is attached to be established easily, providing accurate and reliable data, with a mechanically sturdy structure that—thanks also to the choice of an absolute pressure transmitter—can be sealed hermetically from the outside environment and thus protected against damage, however aggressive the medium in question, and that needs no particular servicing even after many years of usage.

The element thus conceived may be modified and variants thereof may be developed without departing from the context of the inventive concept. For instance, the various component parts, such as components 3, 11 12 and 14 could be configured differently, or some of them made in a single piece, and so on. Moreover, all the details may be replaced by technically equivalent elements. In practical terms, any type of materials and size of component may be used, according to need and the state of the art, providing they are compatible with the intended application.

We claim:

1. A device for detecting a position occupied by a mobile element operatively associated therewith in relation to a reference position, said device comprising at least one container containing a fluid and one detector device, said detector device being operatively coupled to said container, wherein said detector device comprises a pressure transducer, wherein said pressure transducer is installed at one end of said container, wherein said pressure transducer performs first and second measurements of the pressure exerted on it by the fluid in said reference position and in said position occupied by the mobile element after movement, wherein said detector device provides a signal indicating the actual angle of inclination of the mobile element in relation to said reference position as a function of said first and second measurements.

2. A position detecting device according to claim 1 wherein said pressure transducer consists of an absolute pressure transmitter.

3. A position detecting device according to claim 1 wherein said detector device comprises an electronic processor operatively connected to said pressure transducer.

4. A position detecting device according to claim 3 wherein said detector device comprises a housing attached hermetically to the outer surface of said pressure transducer, in which said electronic processor is installed.

5. A position detecting device according to claim 1 wherein said at least one container is a capillary and wherein the fluid is an incompressible fluid.

6. A position detecting device according to claim 1 including a first protective element installed around said container.

7. A position detecting device according to claim 6 comprising a vibration-absorbing material inserted in a cavity between said container and said first protective element.

8. A position detecting device according to claim 6 comprising a separator operatively associated with said container.

9. A position detecting device according to claim 8 wherein said separator comprises an elastic diaphragm interfaced with said fluid.

10. A position detecting device according to claim 8 comprising a vacuum chamber operatively coupled to said separator.

11. A position detecting device according to claim 8 wherein said separator is attached hermetically to said first protective element.

12. A position detecting device according to claim 8 comprising a second protective element attached hermetically to said separator, the inside walls of said second protective element delimiting a vacuum chamber operatively coupled to said separator.

13. A position detecting device according to claim 12 comprising an adapter element inserted between said first protective element and said pressure transducer and hermetically attached to said first protective element and said pressure transducer.

14. A position detecting device according to claim 1 wherein said detector device is hermetically sealed with respect to the outside environment.

15. A mobile element designed for use in a fluid environment comprising a shaped hollow body with a portion suitable for connection to an anchoring surface, comprising at least one position detecting device according to claim 1.

16. A mobile element according to claim 15 wherein said at least one position detecting device is installed inside the hollow body of said mobile element and is solidly attached thereto.

17. A mobile element according to claim 15 wherein said at least one position detecting device is installed in a position proximal to a point of anchorage of said mobile element.

18. A mobile element designed for use in a fluid environment comprising a shaped hollow body with a portion suitable for connection to an anchoring surface, comprising at least two position detecting devices according to claim 1, installed on opposite sides of a plane containing an axis of anchorage of said mobile element.

* * * * *